United States Patent [19]

Edwards et al.

[11] 4,355,449

[45] Oct. 26, 1982

[54] METHOD OF ASSEMBLING AND DISASSEMBLING A CONTROL COMPONENT STRUCTURE

[75] Inventors: Gerald T. Edwards; Donald C. Schluderberg, both of Lynchburg, Va.

[73] Assignee: The Babcock & Wilcox Company, New Orleans, La.

[21] Appl. No.: 269,188

[22] Filed: Jun. 1, 1981

Related U.S. Application Data

[62] Division of Ser. No. 952,523, Oct. 18, 1978, Pat. No. 4,314,885.

[51] Int. Cl.³ .............................................. B23P 19/00
[52] U.S. Cl. .................................. 29/426.2; 29/426.4; 29/426.5
[58] Field of Search .............. 376/327, 224, 262, 440, 376/441, 442; 29/426.2, 426.4, 426.5

[56] References Cited

U.S. PATENT DOCUMENTS

| | | | |
|---|---|---|---|
| 3,361,639 | 1/1968 | Ashcroft et al. | 376/441 |
| 3,472,046 | 10/1969 | Polter | 64/28 |
| 3,769,158 | 10/1973 | Winders | 376/440 |

*Primary Examiner*—Leon Gilden
*Attorney, Agent, or Firm*—Robert J. Edwards; D. Anthony Gregory; J. Henry Muetterties

[57] ABSTRACT

A technique is provided for engaging and disengaging burnable poison rods from the spider in a fuel assembly. The cap on the end of each of the burnable poison rods is provided with a shank that is received in the respective bore formed in the spider. A frangible flange secures the shank and rod to the spider. Pressing the shank in the direction of the bore axis ruptures the frangible flange to release the rod from the spider.

5 Claims, 3 Drawing Figures

METHOD OF ASSEMBLING AND DISASSEMBLING A CONTROL COMPONENT STRUCTURE

This application is a division, of application Ser. No. 952,523, filed Oct. 18, 1978 now U.S. Pat. No. 4,314,885.

TECHNICAL FIELD

This invention is directed to improvements in nuclear reactor fuel assemblies, and, more particularly, to methods and apparatus for securing and removing burnable poison rods from the spider in a fuel assembly, and the like.

BACKGROUND ART

To produce useful power from nuclear processes it is necessary to assemble a sufficient concentration of fissionable uranium, or other suitable material, in a physical configuration that will sustain a continuous sequence of energy-producing reactions. This assembly, or reactor core, transfers the heat that is generated in the fission reactions to a working fluid. Frequently, pressurized water flowing through the core at high velocities is used for this purpose.

Because the heat, vibration and radiation that is generated within a power reactor core creates a generally hostile environment, the structural integrity of the core components is an important consideration. Consequently, pressurized water power reactor cores frequently are comprised of groups of fuel assemblies that are arranged in a generally right circular cylindrical configuration. Each fuel assembly, moreover usually comprises an array of about two hundred along slender fuel rods that are parallel to and spaced from each other. Each of these fuel rods contains a stack of generally cylindrical uranium dioxide pellets in which the uranium provides the fissionable fuel for the power reactor.

These fuel assemblies are not limited to fuel rods but also support a number of other components. For example, instrumentation tubes for observing temperature and neutron flux conditions within the core; end fittings and fuel element grids for stabilizing the fuel assembly components; and control rods and control rod guide tubes for regulating the power output from the reactor through the selective absorption of fission inducing neutrons within the reactor core often are made a part of the fuel assembly structure.

Clearly, the neutron distribution will vary from place-to-place within the reactor core. Illustratively, near the core perimeter it can be expected that the neutron population will be small relative to the center of the reactor core because the concentration of neutron producing uranium is lower at the core perimeter than it is in the center of the core. Neutrons at the core perimeter can "escape" from the core more readily through the core surface than they can from the center of the core, further tending to reduce the neutron concentration near the reactor core surface. Because heat generation within any specific portion of the reactor core is related to the neutron population within that portion, there is a definite tendency to produce higher temperatures at the center of the reactor core than at its margin. This inclination toward producing local temperature maxima in different regions within the reactor core is generally undesirable for a number of reasons. Primarily, the reactor is designed for core operation that will not exceed a predetermined temperature. If this core temperature is reached in just one or in a few local points within the reactor core, the overall heat generating potential of the core can not be realized. This effect results because the temperatures elsewhere in the core must be kept to lower values in order not to exceed the design temperature at those limited points or "hot spots" in which the maximum design temperature has been reached.

Accordingly, in the simplified example under consideration, over-all reactor power can be increased if the neutron population (and hence, heat) in the central portion of the core is depressed and the neutron population in the larger volume that characterizes the peripheral reactor core annulus is allowed to increase. In this way, by "flattening" the power distribution in the reactor core, the core actually is able to generate more power than it would be able to generate if the neutron concentration, temperature and power was allowed to reach a peak in the center of the core, or in some other location, as the case may be. In order to achieve this "flat" power distribution, it has been the practice to insert "burnable poison" rods in the fuel assemblies. Typically, a burnable poison rod is a tube filled with a material that has a very high probability for absorbing neutrons. For example, a sintered dispersion of boron carbide in an alumina matrix is suitable for this purpose.

Neutrons, absorbed in this manner by means of the material within the rod are, in effect, withdrawn from the fission and power generation process. And so, to "flatten" the power distribution with a reactor core, burnable poison rods are concentrated in those fuel assemblies that are located in the central portion of the reactor core.

Depending on a number of subtle effects it also might be advisable to provide burnable poison rod concentrations in other portions of the reactor core in which specific design or operational features produce large local neutron populations.

Not only must the fuel assembly support all of these diverse structural components in spite of the generally hostile environment within a reactor core, but the fuel assembly also must be capable of the somewhat conflicting need for swift and easy disassembly. For instance, it should be noted that fuel assemblies become radioactive after exposure in an operating reactor core. This radiation is so intense that inspection and repair can be accomplished only with remote handling equipment behind adequate radiation shielding. Consequently, because disassembly procedures are expensive and time consuming, the need for a sturdy, yet readily dismountable structure is of considerable commercial importance.

The burnable poison rods that are used in many fuel assemblies are a part of this structural picture. Generally, the burnable poison rods that have characterized the prior art are mounted for movement in a direction that is parallel to the longitudinal orientation of the fuel rods. A "spider", in the form of a centrally disposed hub from which a number of arms radiate often is used to couple the burnable poison rods together for longitudinal movement relative to the balance of the fuel assembly. This motion is required to permit the power reactor operator to insert or withdraw the burnable poison rods from the reactor core in response to power flattening needs.

Eventually, lumped burnable poison rods must be removed from operation, packaged in a cask that provides adequate radiation shielding and then shipped for disposal at a suitable site. It is desirable to remove each of the rods from the spider in order to economize on the volume of the shipping cask. Unfortunately, removing the burnable poison rods from the spider is complicated and potentially hazardous for a number of reasons. The irradiated poison rods have developed, after sufficient irradiation in the reactor core, an internal gas pressure. The cladding or tubing in which the burnable poison has been loaded also becomes quite brittle as a result of a period of irradiation. The burnable poison rods usually are joined to their respective spider arms by means of threaded fasteners. In these circumstances, the most frequently suggested techniques for removing the rods from the spider are by means of shearing or sawing. Sawing the rods permits these rods to be handled more gently—an important consideration in view of the gas pressure within the rods—but the sawing process generates radioactive chips. Shearing overcomes this problem to a large extent, but does nevertheless result in undesirably rough handling.

There is, then a need for some suitable means for joining burnable poison rods to the spider arms in a manner that is proof against the reactor core environment but permits these rods to be removed from the spider simply, swiftly and delicately.

SUMMARY OF THE INVENTION

These and other problems that have beset the prior art are overcome through the practice of the invention. More specifically, a pin is secured to one of the transverse ends of a burnable poison rod. The pin is seated in a bore that is formed in the spider arm appropriate to the rod under consideration. Suitable means are provided for securing the rod to the spider arm. Illustratively, welding a frangible flange on the pin to the adjacent portion of the spider arm are suitable for this purpose.

In accordance with a salient feature of the invention, the burnable poison rod is separated from the spider arm by applying a force in a direction that is coicident with the longitudinal axis of the rod and its associated pin. The force is of sufficient magnitude to press the pin out of the spider arm. The frangible flange, for example, breaks along a predetermined score line, "weak point", or designed plane of fracture to enable the pin to pass through the spider arm bore.

In these circumstances, although considerable force may be applied to press the pin through the spider arm bore, it will be noted that the force is applied in a longitudinal direction relative to the pin. This feature of the invention not only protects the brittle, pressurized burnable poison rod from risk of fracture or other damage due to the rough handling that characterizes shearing but also avoids producing a mass of radioactive chips if the rod is to be sawed free from the spider.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

DETAILED DESCRIPTION OF THE PREFERRED EMBODIMENTS

Figure 1:
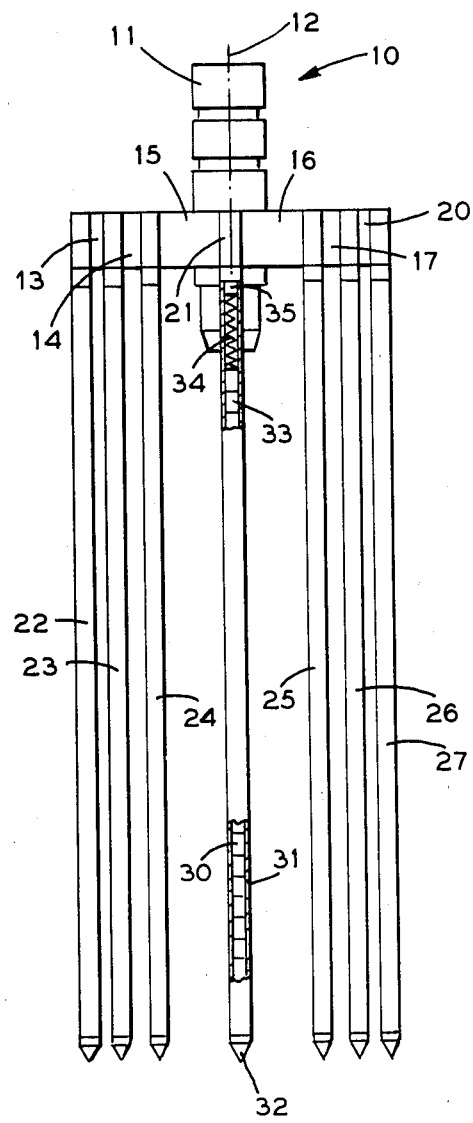
FIG. 1 shows a typical spider and burnable poison rod combination.

For a more detailed understanding of the invention, attention is invited to FIG. 1. As illustrated, a spider 10, formed from stainless steel, or the like, is provided with a centrally disposed, generally cylindrical hub 11 that has a longitudinal axis 12. The spider 10 has a number of spider arms that extend radially from the hum 11 in a plane that is perpendicular to the axis 12. For purposes of simplified description, only spider arms 13, 14, 15, 16, 17, 20 and 21 which are viewed in the plane of FIG. 1 of the drawing are shown.

A group of burnable poison rods 22, 23, 24, 25, 26, 27 and 30 are attached to their respective spider arms. All of these burnable poison rods are long, slender tubes in which the longitudinal axis of each of these tubes is parallel with the longitudinal axis 12 of the hub 11. As illustrated in more detail with respect to the burnable poison rod 30, a hollow tube 31 forms the outer surface of the rod. On longitudinal end of the tube 31 is sealed by means of a solid plug 32 that is welded or otherwise secured in the open tube end. Within the tube 31 and bearing against the plug 32 is a stack of short cylindrical burnable poison pellets 33. The individual cylindrical pellets in the stack 33 are pressed together in a longitudinal direction by means of a spring 34 which is lodged between the last pellet in the stack 33 and a plug 35 that is secured in the other open end of the hollow tube 31.

Figure 2:
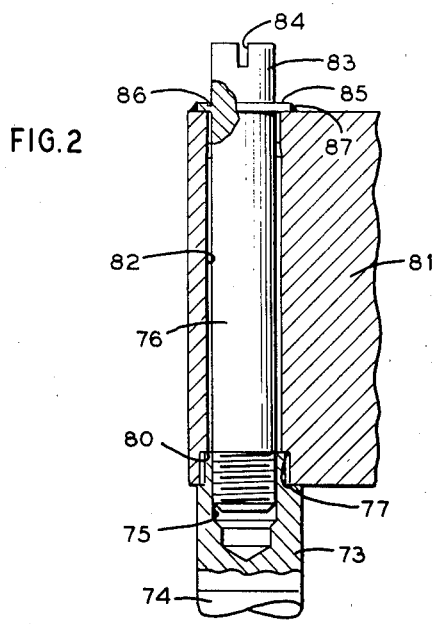
FIG. 2 shows another embodiment of the invention.

Accordingly, an embodiment of the invention is shown in FIG. 2. As illustrated, an end cap 73 provides a closure for one end of a burnable poison rod 74. The end cap 73 has a longitudinally disposed tapped bore 75 which receives a threaded end of a stem 76. The external cylindrical surface of the end cap 73 has a flanged shoulder 77 that is seated in and bears against the bottom of a recess 80 that is formed in a spider arm 81. The recess 80 is in longitudinal alignment with a bore 82 that has a slightly larger diameter than the diameter of the stem 76.

A longitudinal portion 83 of the stem 76 protrudes above the spider arm 81. A kerf 84, moreover, is formed in the protruding portion 83 of the stem 76. The kerf 84 provides a means for applying a screwdriver, or the like to thread the stem 76 into the tapped bore 75 in the end cap 73.

In accordance with a salient feature of this embodiment of the invention, a transversely disposed flange 85 protrudes outwardly from the surface of the protruding longitudinal portion 83 of the stem 76 to which it is joined. The diameter of the flange 85 has sufficient dimension to extend beyond the bore. 82 in order to bear against a surface of the spider arm 81.

The flange 85 is provided with a circular grooved recess 86 formed in that part of the protruding portion 83 that is adjacent to the surface of the stem 76 and in longitudinal alignment with the bore 82. Spot or tack welds 87, or the like, secure the flange 85 and the associated stem 76 rigidly in position on the spider arm 81.

Figure 3:
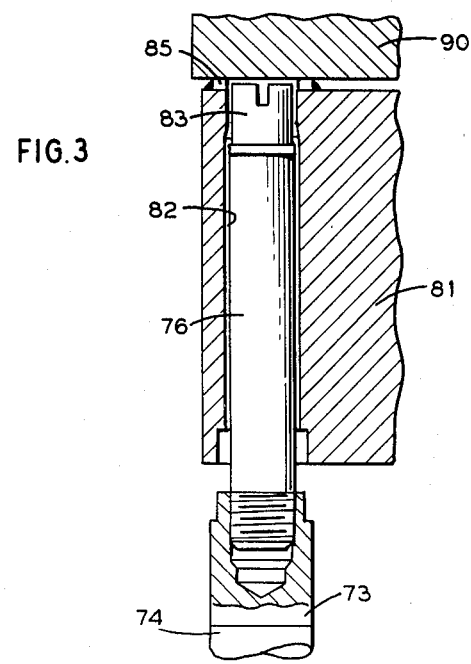
FIG. 3 illustrates a technique for removing the burnable poison rod shown in FIG. 2 from a spider arm.

In operation, a plate 90 (FIG. 3) is superposed over the spider arm 81. The plate 90 is advanced in a longitudinal direction that is in axial alignment with the bore 82 in order to press against the protruding portion 83 of the stem 76 with sufficient force to break the stem 76 from the flange 85 at the design "weak point" formed by the grooved recess 86 (FIG. 2) and thereby overcome the force that hitherto had secured the stem 76 in the spider arm 81. In this manner, the stem 76 and the associated burnable poison rod 74 are disengaged from the spider arm 81. The stem 76 then can be unthreaded from the burnable poison rod 74 and the end cap 73. In this foregoing manner, the burnable poison rod 74 can be removed from the spider arm 81 without assuming the hazards inherent in a sawing or shearing removal operation.

The plate 90 can be enlarged to extend across several or all of the burnable poison rods in a spider and, through a single, longitudinal stroke, disengage a group of burnable poison rods, thereby eliminating a time-consuming, tedious and, in some respects, hazardous activity that has characterized the prior art.

The embodiments of the invention in which an exclusive property or privilege is claimed are defined as follows:

1. A method of assembling and disassembling a control component structure for a nuclear reactor comprising the steps of; providing a spider having at least one arm having a bore formed therein, a burnable poison rod having an end cap with a larger diameter than the bore's diameter, and a flanged stem,
inserting the stem in an axial direction into the spider bore until further insertion is precluded by a retaining force which is provided by the flange resting against the spider
affixing the inserted end of the stem to the burnable poison rod,
applying a force to the rod and stem in the axial direction with respect to the spider bore with sufficient force to overcome the retaining force by breaking the flange, and
withdrawing the stem from the spider bore while maintaining structural unity of the poison rod and maintaining structural unity of the spider.

2. A method of assembling and disassembling a control component structure for a nuclear reactor comprising the steps of; providing a spider having a plurality of arms, each arm having a bore formed therein, a burnable poison rod having an end cap with a diameter larger than the bore's diameter, and a flanged stem, said flange is provided with a groove spaced circumferentially around the stem,
inserting the stem in an axial direction into the spider bore until further inspection is precluded by a retaining force which is provided by the flange resting against the spider,
affixing the inserted end of the stem to the burnable poison rod,
applying a force to the rod and stem in the axial direction with respect to the spider bore with sufficient force to overcome the retaining force by breaking the flange at the groove, and
withdrawing the stem from the spider bore while maintaining structural unity of the poison rod and maintaining structural unity of the spider.

3. A method of assembling and disassembling a control component structure for a nuclear reactor comprising the steps of; providing a spider which has a plurality of arms, each arm having a bore formed therein, a burnable poison rod and a flanged stem,
inserting the stem in an axial direction into the spider bore until further insertion is precluded by a retaining force which is provided by the flange resting against the spider,
affixing the inserted end of the stem to the burnable poison rod,
welding the flange to the spider,
applying a force to the rod and stem in the axial direction with respect to the spider bore with sufficient force to overcome the retaining force by breaking the flange, and
withdrawing the stem from the spider bore while maintaining structural unity of the poison rod and maintaining structural unity of the spider.

4. A method of assembling and disassembling a control component structure for a nuclear reactor comprising the steps of; providing a spider which has a plurality of arms, each arm having a bore formed therein, a burnable poison rod having an end cap with a diameter larger than the bore's diameter, and a flanged stem, said flange is located at a point below the top of the stem such that the stem protrudes above the spider;
inserting the stem in an axial direction into the spider bore until further insertion is precluded by a retaining force which is provided by the flange resting against the spider,
affixing the inserted end of the stem to the burnable poison rod,
pressing the rod and stem in the axial direction with respect to the spider bore by pressing downward on the protruding stem with sufficient force to overcome the retaining force by breaking the flange, and
withdrawing the stem from the spider bore while maintaining structural unity of the poison rod and maintaining structural unity of the spider.

5. The method of assembling and disassembling a control component structure for a nuclear reactor according to claims 1, 2, or 3 whereas the step of applying a force to the rod and stem comprises the step of pressing the rod and stem in an axial direction with respect to the spider bore with sufficient force to overcome the retaining force by breaking the flange.

* * * * *

UNITED STATES PATENT AND TRADEMARK OFFICE
CERTIFICATE OF CORRECTION

PATENT NO. : 4,355,449
DATED : October 26, 1982
INVENTOR(S) : Gerald T. Edwards and Donald C. Schluderberg It is certified that error appears in the above-identified patent and that said Letters Patent are hereby corrected as shown below:

Column 1, line 34, "along" should read -- long --.

Column 3, line 43, "coicident" should read -- coincident --.

Claim 2, line 10, "inspection" should read -- insertion --.

Signed and Sealed this

Nineteenth Day of April 1983

[SEAL]

Attest:

GERALD J. MOSSINGHOFF

Attesting Officer

Commissioner of Patents and Trademarks